United States Patent [19]

Miceli

[11] 3,898,876
[45] Aug. 12, 1975

[54] INTERNAL COMBUSTION ENGINE PERFORMANCE EFFICIENCY ANALYZER AND METER DEVICE

[76] Inventor: Gilbert F. Miceli, 82 Florida St., Long Beach, N.Y. 11561

[22] Filed: Feb. 14, 1974

[21] Appl. No.: 442,510

[52] U.S. Cl. .............................................. 73/117.3
[51] Int. Cl.² ........................................ G01M 15/00
[58] Field of Search ........................... 73/117.3, 112

[56] References Cited
UNITED STATES PATENTS

| | | | |
|---|---|---|---|
| 2,444,014 | 6/1948 | Williams ........................... | 73/118 X |
| 2,561,881 | 7/1951 | Oetting ......................... | 116/DIG. 36 |
| 3,789,658 | 2/1974 | Olsen ................................ | 73/117.3 |

Primary Examiner—Jerry W. Myracle

[57] ABSTRACT

In a preferred embodiment of the invention, there are included a plurality of separate and distinct analyzers of functions of internal combustion engine efficiency such as distributor points primary coil positive terminal voltage monitoring by a voltmeter to determine whether or not voltage thereof remains at a satisfactorily high level as indicative of the presence or absence of problems of wear or the lack thereof of the distributor points, and such as monitoring the voltage from selectively separate ones of the spark plugs as metered through the same voltmeter separate from or alternately concurrent with the monitoring of the voltage of the distributor points such that separate readings may be taken for the voltage of the distributor points collectively or for any one of the spark plugs either individually or with an individual one having the signal thereof unified with the signal of the collective distributor points concurrently to get an average efficiency, and the meter mechanism including separate lighting elements one each for separately identifying the specific function or the combined functions being monitored at any particular time, the light element for any function being lit only when a particular function associated therewith is being monitored. Another typical function for separate monitors and for averaging with other signals are the motor rpm, or carbon monoxide content as a function of richness of the air/fuel mixture, as measured as temperature of exhaust gases.

10 Claims, 5 Drawing Figures

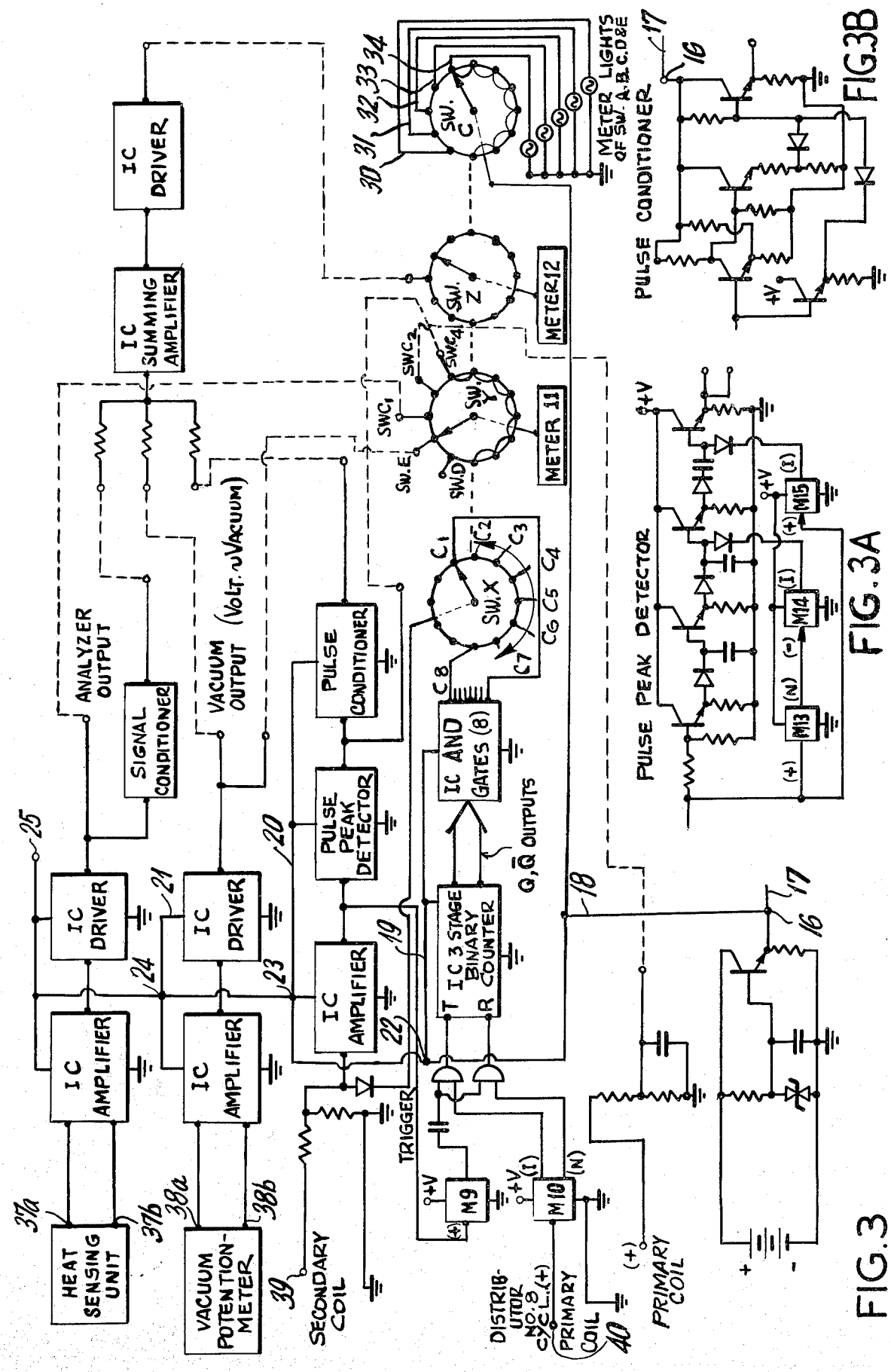

INTERNAL COMBUSTION ENGINE PERFORMANCE EFFICIENCY ANALYZER AND METER DEVICE

This invention relates to an analyzer and metering device for mounting on an automobile or truck as a part of standard equipment to make possible a continuous or continual surveillance by the operator of the efficiency of the internal combustion relative to the conversion of fuel to working motor energy.

BACKGROUND TO THE INVENTION

Recently there has been an increasing urgency in the need for improved efficiency of automobile internal combustion engines in order to obtain the maximum benefit of energy gained from the combustion of fuel such as petroleum gasoline fuels. This urgency has been made more critical by the recent and present energy crisis leading to an extreme emergency shortage of gasoline. However, by improved efficiency of a gasoline internal combustion engine, reference is not made merely to the initial efficiency of such an engine as it rolls off of the assembly line by the automobile manufacturers, but rather just as important and possibly more important is the continued maintenance of the automobile by the driver in order to prevent efficiency from slipping to extreme low levels. Low levels of automobile efficiency in so far as the overall performance of an automobile not only penalizes the public in general by these users of automobiles of low efficiency requiring more gasoline and more needless corrective manpower and time in the eventual correction of such machines after deterioration reaches ridiculously inefficient points, but additionally such lack of maintenance by the operators serves to penalize the particular indiviual owner of the faulty automobile by virtue giving him less for his money for the limited amount of fuel available to him and having to compete with other citizens who obtain much higher efficiencies or mileage for similar quantities of gasoline. The lack of efficiency and lack of maintenance by many operators is not however always a reflection on the presence of lassitude of the drivers themselves, but rather a result of ignorance on the part of most drivers of warning signals that might otherwise be recognized by an experienced mechanic or engineer. Being that most drivers are not experienced mechanics nor engineers however, the typical automobile owner and driver is left in a problem situation as to how to determine when some particular aspect of the automobile engine needs to be adjusted to prevent further deterioration and in order to restore and maintain efficiency at prior high levels for his particular automobile. Prior to the present invention, there has not — to the inventor's knowledge in any event — any provision for the incorporation into the automobile cab any gauges of real of substantial significance for the monitoring of the basic automobile functions relating to gas mileage efficiency other than the standard generator, gasoline, speed, oil pressure and the like, such indicators not being of the type needed for an accurate evaluation of the performance of the engine in so far as elements and conditions in need of correction or repair or general maintenance. Moreover, prior to the present invention, even though there have been analyzers produced and/or invented to determine low efficiencies and/or problems with regard to points, spark plugs, hydrocarbon content of exhaust gases, and the like, there have not been produced nor suggested any such systems suitable for use by the typical automobile driver who normally professes total ignorance in so far as the reading of complicated meters. Additionally, the time that the driver ordinarily has to shift his eyes and attention to any gauges on the dash board that might be indicative of the relative performance of the automobile engine is a very limited period if safety to the driver and passengers of the automobile is to be maintained by principal attention being retained on the highway and in the necessary maneuvers of driving the automobile. For example, U.S. Pat. No. 3,499,322 discloses an automobile engine analyzer of multiple functions utilizing an oscilloscope with $x$ and $y$ axis leads and with the need of considerable education and training for the proper understanding and interpretation and adjustment of inputs into the system reliably. Also, such a device was not intended and is not suitable for use by the amateur nor as a permanent part of an automobile. Also, the circuitry and equipment thereof would be excessively expensive for adaptation to an automobile as a permanent fixture thereof. In like manner, the analyzer of U.S. Pat. No. 3,485,093 combines a number of transducers and programmed data and the like in an analyzer clearly above the comprehension of the typical automobile driver and clearly intended to be utilized by a highly skilled engineer or mechanic capable of understanding, operating, and interpreting intelligently the result of the read-outs, such a system also not in the least adaptable for use as a permanent fixture of an automobile. The U.S. Pat. No. 3,324,711 illustrates know technology for determining and evaluating spark ignition internal combustion engine and fuel efficiency and in like manner represents a complicated structure and use thereof and circuitry therefor, clearly providing engineers a device and method for making such analysis on various automobile engines, but again clear such device is not suitable for nor intended for use by amateurs nor for use as an intimate part of an automobile itself, the interpretation of this systems read-out also requiring special knowledge and training. The same is true for the U.S. Pat. No. 3,572, 103 directed to the analysis of individual cylinder performance of internal combustion engines, the read-out panel and switches and circuitry being extremely complicated and far beyond the operating comprehension of a typical automobile owner or driver as well as being totally unsuitable in its mode of operation for incorporation into an automobile as a permanent fixture of the automobile. Another typical patent directed toward the analysis of gasoline performance is U.S. Pat. No. 3,208,273 which also requires a special apparatus and understanding by the operator in order to adequately utilize the device, much less understand the read-out performance, this device also being in no manner intended for incorporation permanently into an automobile.

SUMMARY OF THE INVENTION

Accordingly, objects of the present invention include the obtaining of a device overcoming one or more of the difficulties, problems, and disadvantages of the types discussed above, together with novel and desirable advantages advantageous to the amateur automobile driver characteristically unfamiliar with the technicalities of engineering and of internal combustion engine performance.

Another object is to obtain a device suitable for the permanent mounting on existing automobiles as well as on the automobiles during the manufacture of the automobile, for efficient analysis and graphic representation in a simplified intelligible manner the efficient performance of one or more elements of an automobile engine in the running of the engine on petroleum fuel such as gasoline.

Another object is to obtain one or more of the preceding objects together with the obtaining of a simple circuitry and/or a minimum of parts and element and/or in the mounting thereof a minumum of skill or knowledge required as well as a minimum of time for the installation thereof.

Another object is to obtain an automobile analyzer easily mountable as and a part of an automobile providing for an easy and quick accurate reading and interpretation of read-out data thereof thereby avoiding the necessity of causing safety hazards that might result from prolonged diverted attention from normal driving functions of the automobile driver.

Another object is to obtain an efficiency analyzing device of an internal combustion engine performance, having a maximum flexibility for the analyzing of diverse individual as well as overall performance of different engine components and functions and characteristics.

Another object is to obtain an efficiency analyzer device for an internal combustion engine utilizing multiple parts for analysis of more than one function.

Another object is to obtain a plurality of the preceding objects concurrently.

Other objects become apparent from the preceding and following disclosure.

One or more objects of the invention are obtained by the invention as defined herein.

Broadly the invention may be defined as an analyzer of several functions of an internal combustion engine separately selectable one-at-a-time and/or averaging signals from two or more of individual functions with one-at-a-time display of such individual read-out or such average read-out, by analyzers easily connectable to known terminals of automobile electric systems circuitry and/or easy insertion for purposes of richness-of-fuel analysis, together with the one or more one-at-a-time visible read-out meters on or in close proximity of the dashboard of an automobile, of a simple scale of efficiency understandable by a person having little technical knowledge or experience, while obtaining the ends by a mechanism and circuitry of extreme simplicity thereby holding down the overall initial cost and maintenance of such equipment such as by the multiple use of a single voltometer for more than one analyzer's signal as a part of the metering device as well as for example the monitoring of individual cylinder being adaptable also to any one thereof or alternately to a plurality of cylinders concurrently. Such would be readable on the same voltometer on the same or different reading face(s) but would preferably be concurrently averaged by a voltmeter device with signals of exhaust and of engine vacuum (oil pressure) for separate read-out or for averaging the signal thereof with the signal(s) from the cylinder spark plug(s). Also, the averaged separate functions are separately readable such other functions, being readable one at a time, no two or more meters being visible at any one time. Spark plug dwell may be separately metered.

In particular, preferred embodiments of the invention include a main meter identified as an average typically and preferably in terms of percentage points or a scale of one to ten or the like, reflecting the indicating needle typically of a voltmeter receiving a combined signal from two or more functions concurrently such as preferably a read-out signal from an amplifier or driver (electronic) associated with one or more spark plugs as one signal, and with a read-out signals associated derived from typically thermistor of exhaust manifold and a vacuum engine signal emitter. Other separate read-out meters typically include a positive-terminal distributor lead for reflecting point dwell efficiency, but mounted connected to commonly utilize preferably a single voltmeter alternately with the read-outs of one-another and/or with the read-outs of other functions from other analyzers, such as sharing a voltmeter with signal leads to a separately lighted average-efficiency scale reflecting the averaged signal of two or more analyzer functions. A vacuum detector for detecting a measure of running efficiency of a motor is employable, but alternately, for example, a tachometer may monitor revolutions per minute directly of the engine. Typical and preferred averaged functions' signals include the fuel richness (as reflected possibly by exhaust gas temperature), the motor efficiency (vacuum or rpm or the like), and spark plug efficiency (all plug' signals simultaneous monitored during their consecutive firings). Preferably there are separate visible meters for each of the individual and/or combined efficiency functions' read-outs, but all meters being substantially invisible to the eye in so far as ability to read the meter except when that particular meter is specifically manually or otherwise specifically selected by a selector device which thereby turns on a light and circuit for each meter read-out scale function.

The invention may be better understood by making reference to the following Figures.

THE FIGURES

FIG. 3 illustrates graphically the circuitry of a typical preferred embodiment of the present invention.

FIGS. 3A and 3B show pulse peak detector and pulse conditioner circuits, respectively.

DETAILED DESCRIPTION

Figure 1:
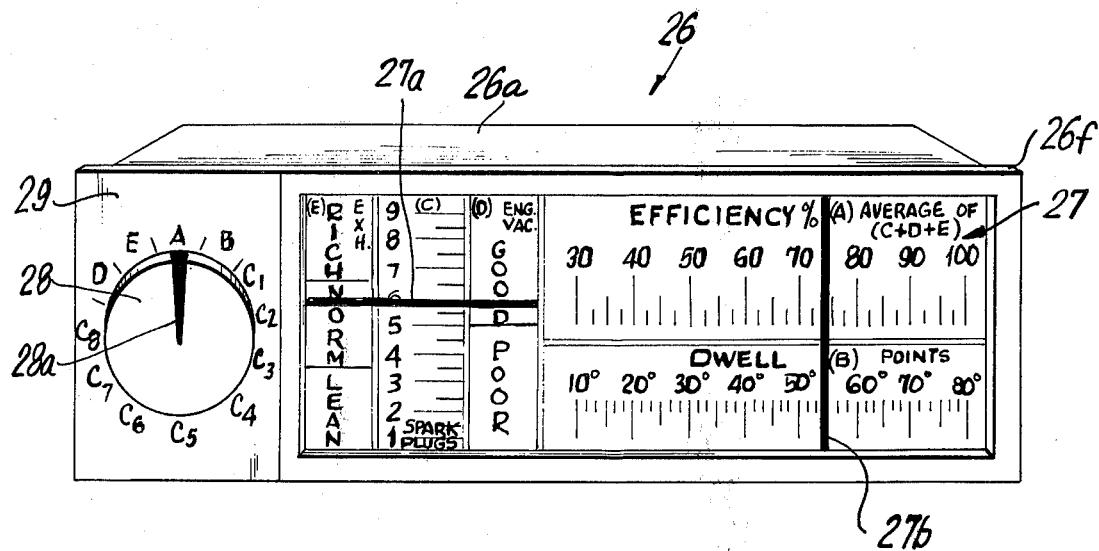
FIG. 1 illustrates a perspective front top view of a typical automobile dashboard housed unit of the present invention having multiple meter scales thereon for different read-out functions separately or as averaged, together with a selector manual dial and switch selector for selection of the desired read-out.

In greater particularity, the preceding merely typically illustrated but preferred embodiment of the invention includes an instrument and meter casing 26 having front face flanges 26e circumscribing the several meters and scales thereof, the meters being broadly designated 27, with the casing top 26a, ends 26c and 26d, and bottom 26b with vents therein, the vents identified as vents 36 optionally illustrated in the bottom, and back 26e. Also shown in the FIG. 2 bottom view is the cord 35 carrying a plurality of power and signal leads of the circuitry of FIG. 3. Also as shown in the FIG. 1 view, the front face includes the selector panel 29 with the various alternate selector indicia arranged circumscribingly around the selector manual switch lever 28 with its pointer 28a. The meters 27 include the (A) EFFICIENCY percentage meter for reflecting an overall efficiency of averaged signals such as for this embodiment identified on the meter face as the average of the total signals from analyzers C(all cylinders) and D and E, where the respective meters C, D, and E are further respectively identified as meters for (C) Spark Plugs, (D) Engine Vacume, and (E) Exhaust. The (B) Dwell meter refects the distributor points dwell efficiency. An important feature of the present invention is the simplicity of representation of the various functions for easy understanding generally by an ameteur of little or no mechanical knowledge, understanding or ability. A further major desirable feature is the fact of ease of concentration on a single meter, the various meters in actual practice being darkened and not discernable except for a one particular meter that is selected by the selector switch lever 28 to thereby turnon the meter light for that particular meter and scale thereof as illustrated in FIG. 3 as the light circuits 30, 31, 32, 33, and 34 for meter (dial) faces and light circuits of selector positions A, B, C, D, and E respectively, as well as the C light remaining on for each of the $C_1$ through $C_8$ selector positions corresponding to the numbers 1 through 8 cylinders of an eight cylinder autombile. For an automobile of fewer cylinders, the extra C positions would be merely inoperative, or alternately a differing dial face would be employed. It is to be understood that although the represented functions are believed to be the preferred ones, it is equally possible to select more or less functions, and to average more or less for the (A) Efficiency meter, within the spirit and scope of the invention.

Figure 2:
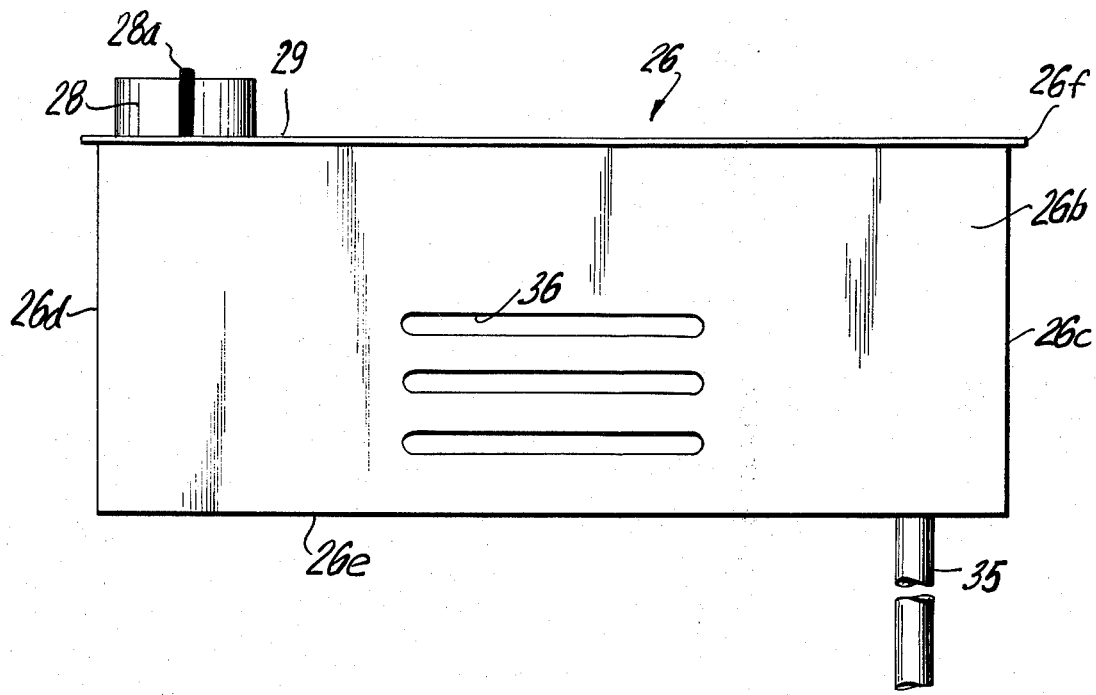
FIG. 2 illustrates a bottom view of the illustrated embodiment of FIG. 1.

The reading of the several meters of FIG. 1 is self apparent, the (A) EFFICIENCY meter reflecting for the average discussed above the relative percentage of maximum signal available when all of the averaged signals each are at their maximum efficiencies. It becomes readily apparent to even the most amateur driver that something is going astray or wrong when the efficiency meter starts getting down to an 80 percent, or 75 percent or 70 percent level, for example -- whether such be rather sudden or gradually. When such is noticed, the driver may readily switch to the individual functions as identified on the Efficiency dial face as C, D, AND E, to determine which one or more is causing the lowered efficiency. When for example a driver leaves the selector on the E position, it is readily possible for such driver to notice the bad effect of continuous pumping of the gas pedal which results in repeated variations toward the too rich fuel mixture by fuel mixture burning hotter and then cooler, this being indicative of a wasting of fuel needlessly in effect by flooding when not necessary. The same is true for too frequent rapid accelerations; also, too rich a fuel reflects higher percentage of pollutants in the exhaust gas as unburned portions of the hydrocarbon fuel as well as high levels of carbon monoxide. However, assuming that none of these problems exist with the particular driver, the efficiency could be a resulting low level because of a poor spark as reflected by the spark plug voltage of meter (C) of the selector, there being a separate position for each plug. It is a very simple matter for a person to be able to see an abnormally low read-out as well as readily possible to compare different spark plugs by switching between them from one to the other to make a relative comparison whereby a poorly functioning one becomes readily apparent. By switching to selector position (D), it may be determined broadly whether the motor is revolving with the normal efficiency as to read "GOOD" or alternatively "POOR"; the poor read-out also will occur whenever the auto is slowed too greatly without shifting gears whether manual or automatic, and during the starting of the engine, whereby too long a poor-read-out indicates a possibility of a problem. The (B) Dwell meter as selected by the B position on the selector dial is in fact a summary of all points in a general distributor points efficiency and is particularly important to serve to facilitate the beginning of a problem possibly before it would become detectable on the C engine efficiency or D spark plugs or E fuel efficiency meters, all of which could be cause to read poorly if the reading on the B points meter were at a low level of efficiency, indicating the need of new or adjusted or corrected points or the timing thereof or the like. Thus, the A and B meters are very important meters for occasional monitoring, for the constant surveillance of the general automobile efficiency.

With regard to the FIG. 3 circuitry, the E analyzer is represented by a heat-sensing unit from which the two leads are connected to the Integrated Circuit (IC) Amplifier which feed an amplified signal to the electronic conventional IC Driver to further intensify the signal, the IC Amplifier and IC Driver each being powered by power lead from power terminal 25 of power lead 18 from power terminal 16. The IC Driver signal is fed to a signal conditioner, to an averaging circuit, an IC Summing amplifier, thereafter to another IC Driver, and thereafter to a wafer switch terminal identified as meter 12. The meter 11 represents the conventional electomagnetic arrangement of a voltmeter to be activated when the selector of the wafer is pointing to any of the positions corresponding to $C_{L-8}$, D or E of a selector dial of FIG. 1, this meter 11 voltmeter serving for each of the selector positions $C_1$, $C_2$, $C_3$, $C_4$, $C_5$, $C_6$, $C_7$, $C_8$, D, and E. When the selector switch is on E, the light of circuit 31 causes the (E) Exhaust meter to light up and become visible for the reading thereof. The indicator lever 27a registers the level of efficiency as controlled by the voltmeter of meter 11, but with solely the dial face of the E meter visible because of solely light of circuit 31 being lit.

The D analyzer is represented by the FIG. 3 VACUUM POTENTIOMETER from which leads go to an IC Amplifier, and then to the IC Driver thereof, both the latter being powered by the power lead 21 to power terminal 24 of lead 18. From the Vacuum Potentiometer IC Driver, the signal is directable also to the summing circuitry and IC Summing Amplifier discussed above.

For the Spark Plug efficiency of totally all plugs considered together, a signal as taken from the secondary distributor coil terminal 39 is fed unimpeded to an IC Amplified when the selector 28 is on A, and from the spark plug IC Amplifier to the Pulse Peak Detector for averaging out the peak voltages at the peaks, and to the Pulse Conditioner, and thereafter the total consecutive distributor voltage signals to the averaging circuitry and IC Summing Amplifier discussed above.

Alternately, for the A position, the signal from the A position IC Driver may be fed to the position of the Meter 11 wafer switch position corresponding to the E selector position of FIG. 1, such that the circuit lead 31 lights up the E Exhaust meter.

In like manner, the signal from the (D) Vacuum Potentiometer IC Driver will be fed to the Wafer D position of Meter 11 wafer switch and to the lighting wafer to light-up the light of circuit lead 30 for the Meter D GOOD-POOR dial.

For the C Secondary Coil terminal 39, the signal from the Pulse Peak Detector is fed to the particular selected C position, i.e. one of the $C_1$ through $C_8$ positions of the Meter 11 wafer switch and of the light wafer to turn on the light of lead 34, to light-up the meter 11 registering meter dial of (C) Spark Plugs ranging typically from 1 to 9 as a scale of efficiency. When the selector of FIG. 1 is placed on $C_1$ position, it causes X wafer switch to regulate the IC AND GATES counter to exclude signals from all spark plug leads of cylinders other than the cylinder No. 1; a similar mechanism works for the other C positions. The meter 11 wafer switch as referred to above is designated as wafer Y. The meter 12 wafer switch as referred to above is designated as wafer Z. The wafer Z serves for directing the signals individually of the IC Summing Amplifier and IC Driver thereof, or alternately the terminal 40 Dwell signal output to the A or B positions respectively whenever the FIG. 1 selector 28 is pointed to the A or the B, respectively, to turn-on the light of lead 32 or lead 33 respectively of meter dials (A) EFFICIENCY or (B) DWELL, respectively.

For the Pulse Peak Detector of the C positions, the circuitry of a typical conventional type pulse peak detector is illustrated in FIG. 3A, and similarly for the Pulse Conditioner, the typical conventional circuitry of a pulse conditioner is illustrated in FIG. 3B, the respective M3, M4, and M5 monostable multivibrator identified as element 13, 14, and 15, all other circuitry being conventional and recognizable, such circuitry being conventional in the art, as are N normal and I inverted outputs.

The wafer switches X, Y, and Z and the light-wafer switch C are conventionally superimposed one on top of the other in actual practice, but are shown in a disassembled state for facilitating understanding of the circuitry.

It is within the spirit and scope of the invention to make variations, modifications, and substitutions of equivalents as would be apparent to a person of ordinary skill. Utilizing the preferred embodiments as illustrated, an inexperienced operator of an automobile may by personal monitoring of the various meters detect the presence of problems and/or difficulties such as follow. For the (B) Dwell Meter, (1) a need to set and/or adjust distributor contact points, and/or (2) need to set and/or adjust point gaps and/or their condition. For the (E) exhaust gas analyzer, (1) adjust the carburetor through the idle-mixture adjustment screws, and/or (2) detect a general problem with the fuel system, and/or (3) accelerator pump test, and/or (4) air filter test, and/or (5) main metering circuit test, and or (6) power circuit test (road test). For the (D) vacuum analyzer, where the normal engine vacuum operating range is from 14 inches to 19 inches of vacuum, as normally phrased by mechanics, detectable problems or tests include (1) leaking valve(s), (2) sticking valve(s), (3) weak or broken valve spring(s), (4) worn valve guide(s), (5) piston ring defect(s), (6) blown cylinder head gasket problem(s), (7) incorrect idle air-fuel mixture, (8) restricted exhaust system, (9) intake manifold system air leaks, (10) late ignition timing, (11) late valve timing, (12) balancing dual carburetors using highest vacuum reading, and (13) adjust valve clearance with those engines with adjustable valves. For the (C) cylinder analyzer, detectable problems relate to (1) wide spark plug gaps, (2) burned distributor rotor, (3) burned distributor cap points, (4) condenser leak(s), (5) defective ignition coil, (6) high resistance between the breaker points, (7) spark plug wires shorting, and (8) spark plugs fouled.

In operation, a preferred embodiment has a Plexiglass facing as a covering for the meter read-out portions, as clear Plexiglass. The inward side will be coated with a black opaque substance. Transcribed on the inward side is (are) letter(s) and numeral value(s) associated with each meter, and a separate light source for each meter with a partition between the separate meters in order to accomplish the goal of individualizing each meter. By allowing only the corresponding meter to be seen that corresponds to the selector selected function, absolutely no confusion can occur. Most importantly, the time element involved in taking ones eyes off the road to scan the function being monitored has been reduced to a fraction of a second instead of several seconds.

According, the invention claimed is as follows.

I claim:

1. An internal combustion engine efficiency analyzer and indicating device comprising in combination: a plurality of at least first and second separate analyzer means for analyzing at least first and second functions selectively of efficiency in performance of an internal combustion engine in the burning of fuel therein; meter means for separate monitoring of each of said first and second separate analyzer means and for additionally separately monitoring combined signals of said plurality; selector switch means for separately selecting for monitoring at least separately each of said first and second separate analyzer means respectively and for separately selectively monitoring combined signals of at least some of said plurality; and circuit integration means for selectively placing said voltmeter in circuit alternately with output lead of at least said first and second separate analyzer means when said selector means is positioned for selectively monitoring a single voltage signal from at least one of said first and second separate analyzer means, and for connecting said voltmeter to be simultaneously in circuit with said some of said plurality when said selector switch means is positioned for monitoring a combined signal of at least the first and second separate analyzer means.

2. An internal combustion engine efficiency analyzer and indicating device of claim 1, in which said meter means includes at least a first electromagnetic registering means operatively connected to register separately selectively each of monitoring signals from said first and second separate analyzer means.

3. An internal combustion engine efficiency analyzer and indicating device of claim 2, in which said meter means' first electromagnetic registering means is additionally selectivvely monitorable of combined signals from said first and second separate analyzer means.

4. An internal combustion engine efficiency analyzer and indicating device of claim 3, in which said first analyzer means includes a distributor sensor electrical lead for connection to a distributor secondary coil and a counter means having an input lead connectable to a postive terminal of a distributor primary coil, said electromagnetic registering means comprising a volmeter in electrical circuit located behind the distributor output lead, and in which the first analyzer means includes in electrical series with the distributor sensor electrical lead an amplifier means for amplifying a signal monitored from the distributor secondary coil sensor lead, the meter means further first discernable indicia identifying a meter signal monitored from at least one spark plug when said selector means is positioned selectively for monitoring said first separate analyzer means, and second discernable indicia identifying another signal selectively as substantially all individual cylinders' spark plugs voltages as averaged with other signals when said selector switch means is positioned selectively for monitoring averaged signals from at least said first and second separate analyzer means.

5. An internal combustion engine efficiency analyzer and indicating device of claim 1, in which said second separate analyzer means comprises a detector of internal combustion engine fuel-burn efficiency.

6. An internal combustion engine efficiency analyzer and indicating device of claim 5, in which said meter means includes a separate scale and light element therefor for each of said plurality, with each respective light element connected operatively in circuit for the selective lighting thereof only when the selector means is positioned for monitoring a function with which a particular one of said light element is associated.

7. An internal combustion engine efficiency analyzer and indicating device of claim 6, in which said plurality and said meter means each respectively include additional third and fourth monitoring functions respectively comprising separate internal combustion engine functions of motor revolutions per minute for the third of said plurality and for a third read-out of said meter means, and distributor points dwell for the fourth of said plurality and for a fourth read-out of said meter.-means.

8. An internal combustion engine efficiency analyzer and indicating device of claim 1, in which said meter means includes a separate scale and light element therefor for each of said plurality, with each respective light element connected operatively in circuit for the selective lighting thereof only when the selector means is positioned for monitoring a function with which a particular one of said light element is associated.

9. An internal combustion engine efficiency analyzer and indicating device of claim 1, in which said first analyzer means includes a distributor sensor electrical lead for connection to a distributor secondary coil and a counter means having an input lead adapted for connector to a positive terminal of a distributor primary coil, and in which the first analyzer means includes in electrical series with the distributor sensor electrical lead an amplifier means for amplifying a signal monitored from the distributor secondary coil sensor lead, the meter means further first discernable indicia identifying a meter signal monitored from at least one spark plug when said selector means is positioned selectively for monitoring said first separate analyzer means, and second discernable indicia identifying another signal selectively as substantially all individual cylinders' spark plugs voltages as averaged with other signals when said selector switch means is positioned selectively for monitoring averaged signals from at least said first and second separate analyzer means.

10. An internal combustion engine efficiency analyzer and indicating device of claim 9, in which said second separate analyzer means comprises a detector of internal combustion engine fuel-burn efficiency.

* * * * *